United States Patent [19]

Fukuda et al.

[11] Patent Number: 5,126,997
[45] Date of Patent: Jun. 30, 1992

[54] SYSTEM FOR CONTROLLING MOTOR VEHICLE DRIVING FORCE

[75] Inventors: Hirohide Fukuda; Katsuya Miyake; Yoshio Takahashi, all of Saitama; Yuzo Nakakuki, Tochigi; Kinji Ogino, Saitama; Tadashi Iwamoto, Chiba, all of Japan

[73] Assignees: Akebono Brake Industry Co., Ltd., Tokyo; Akebono Research and Development Centre Ltd., Saitama, both of Japan

[21] Appl. No.: 562,426

[22] Filed: Aug. 2, 1990

Related U.S. Application Data

[63] Continuation of Ser. No. 289,474, Dec. 21, 1988, abandoned, which is a continuation of Ser. No. 924,810, Oct. 30, 1986, abandoned.

[30] Foreign Application Priority Data

Oct. 30, 1985 [JP] Japan .................. 60-243407

[51] Int. Cl.$^5$ .............................................. B60T 8/32
[52] U.S. Cl. .................. 364/426.02; 303/97; 303/99; 180/197
[58] Field of Search ............ 364/426.02, 426.03; 180/197; 303/97, 99, 105

[56] References Cited

U.S. PATENT DOCUMENTS

| | | | |
|---|---|---|---|
| 3,625,572 | 12/1971 | Marouby | 303/105 |
| 3,782,783 | 1/1974 | Jones | 303/105 |
| 3,857,612 | 12/1974 | Bynum | 303/105 |
| 3,930,688 | 1/1976 | Rau et al. | 303/100 |
| 3,985,396 | 10/1976 | Kuwana et al. | 364/426.02 |
| 4,036,536 | 7/1977 | Quon | 303/105 |
| 4,209,202 | 6/1980 | Jones | 303/105 |
| 4,395,761 | 7/1983 | Sato et al. | 364/426.02 |
| 4,435,768 | 3/1984 | Arikawa | 303/105 |
| 4,439,832 | 3/1984 | Sato et al. | 364/426.02 |
| 4,446,522 | 5/1984 | Sato et al. | 303/105 |
| 4,637,663 | 1/1987 | Matsuda | 364/426.02 |
| 4,651,281 | 3/1987 | Masaki et al. | 303/100 |
| 4,660,896 | 4/1987 | Matsuda | 303/97 |

FOREIGN PATENT DOCUMENTS 58-146755 10/1983 Japan .

Primary Examiner—Gary Chin
Attorney, Agent, or Firm—Finnegan, Henderson, Farabow, Garrett and Dunner

[57] ABSTRACT

A system for controlling brake pressure on a drive wheel of a motor vehicle, comprising a device for detecting the speed and acceleration of the drive wheel; a brake mechanism including a fluid therein for exerting brake pressure on the drive wheel; a pedal mechanism for manual operation of the brake means; and a control device for deactivating the pedal mechanism when the acceleration exceeds a predetermined initial acceleration value or the speed of the drive wheel exceeds a predetermined first threshold value.

23 Claims, 4 Drawing Sheets

SYSTEM FOR CONTROLLING MOTOR VEHICLE DRIVING FORCE

This application is a continuation of application Ser. No. 07/289,474, filed Dec. 21, 1988, now abandoned which is a continuation, of application Ser. No. 06/924,810, filed Oct. 30, 1986 now abandoned.

BACKGROUND OF THE INVENTION

This invention relates to a system for controlling the driving force of a motor vehicle, such as an automobile. More particularly, the invention relates to a system for maintaining motor vehicle driving force by controlling the speed of revolution of a driving wheel to minimize slipping. The system is applicable to automobiles, tractors, motorized bicycles and the like.

The prior art applicable to the present invention includes a driving force control of the type disclosed by Japanese Patent Application (OPI) No. 146755/83. In that application, a driving wheel is controlled by setting its speed of revolution at a value close to a reference speed by comparing the speed of revolution of the driving wheel to the preferred reference speed, and applying braking force when the above comparison reaches a predetermined state.

With respect to this prior art, however, the speed of the driving wheel sometimes may not appear to converge close to the reference speed, because it often is difficult to detect whether the speed of the driving wheel has deviated from the reference speed. If the acceleration of the driving wheel also is measured as a further reference, the problem is overcome. However, the response of the system may be delayed, because of the time required for this additional multiplication and division, i.e., calculation of the acceleration and output of control instructions based thereon.

SUMMARY OF THE INVENTION

The present invention is intended to solve the above problem of slow response and it is therefore an object of the invention to provide a method and system for controlling driving force which is simple to construct, but excellent in response speed.

To achieve the foregoing objects and advantages, the system of the present invention comprises means for detecting the speed and acceleration of the drive wheel; brake means including a fluid therein for exerting brake pressure on the drive wheel; pedal means for manual operation of the brake means; and control means for deactivating the pedal means when the acceleration exceeds a predetermined initial acceleration value or the speed of the drive wheel exceeds a predetermined first threshold value.

Preferably, the control means also includes gap closing means for automatically supplying the fluid to the brake means for a fixed time period when the acceleration exceeds the initial acceleration value. It is also preferred that the control means include hold means for automatically increasing the brake pressure of the brake means when the speed of the drive wheel is accelerating, and exceeds the first threshold value.

The control means also may include decay means for automatically decreasing brake pressure of the brake means when the speed of the drive wheel is less than the first threshold value. Preferably, the control means includes means for automatically deactivating the hold means and the decay means when the speed of the drive wheel is greater than the first threshold value and less than a second predetermined threshold value.

The control means also may include coast means for automatically decreasing brake pressure when the speed of the drive wheel is decreasing and exceeds the second threshold value, and release means for automatically releasing the pressure of the brake means when the speed is less than the first threshold value for more than a predetermined time period. Threshold setting means may be provided for setting the first and second threshold values, the second threshold value being greater than the first threshold value. Preferably, the threshold setting means includes a rotary sensor.

The system for controlling brake pressure on a drive wheel of a motor vehicle may also comprise means for detecting the rate of acceleration of the drive wheel; brake means for exerting brake pressure on the drive wheel; and control means responsive to the detecting means for automatically increasing the brake pressure existed by the brake means for a predetermined time during acceleration of the vehicle when the rate of acceleration exceeds a predetermined value.

BRIEF DESCRIPTION OF THE DRAWINGS

The accompanying drawings, which are incorporated in, and constitute a part of the specification, illustrate an embodiment of the invention and, together with the description, serve to explain the principles of the invention.

Of the drawings.

DETAILED DESCRIPTION OF THE INVENTION

Referring now to the accompanying drawings, an embodiment of the present invention will be described.

Figure 1:
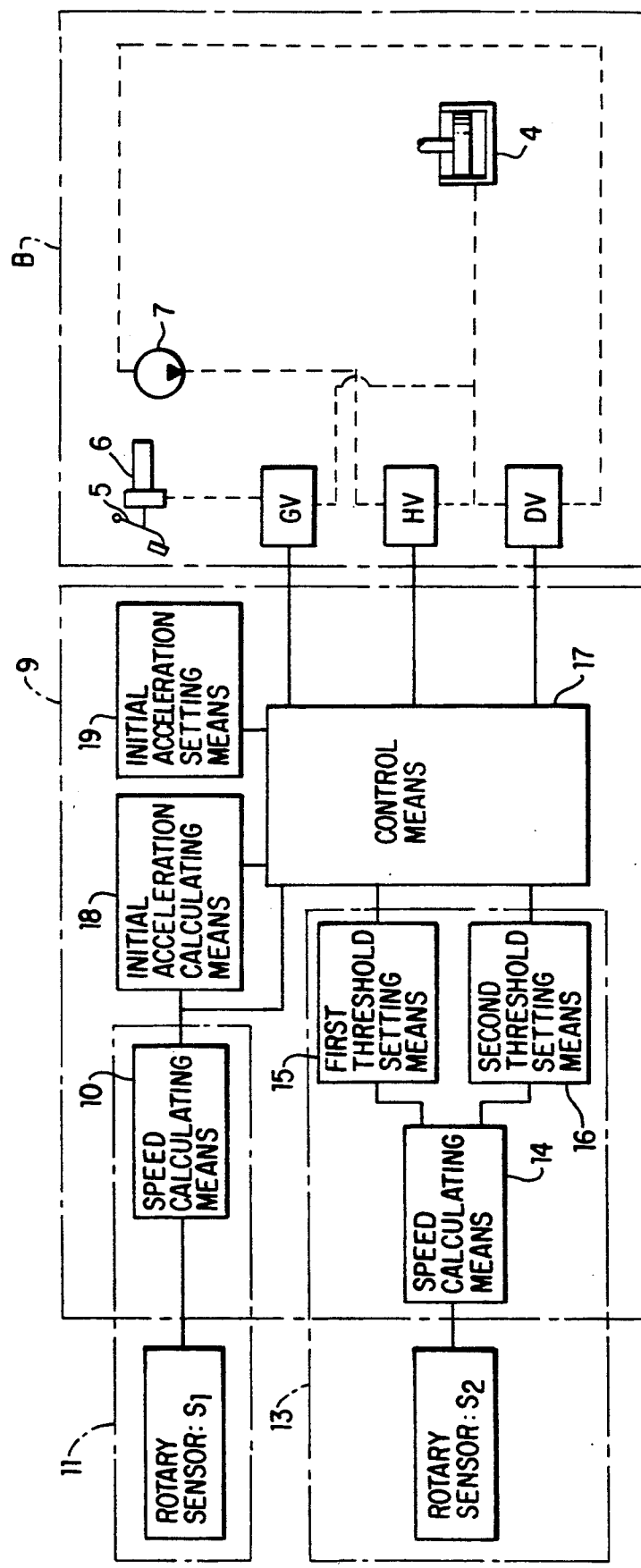
FIG. 1 is a block diagram of a control system embodying the present invention.
Figure 2:
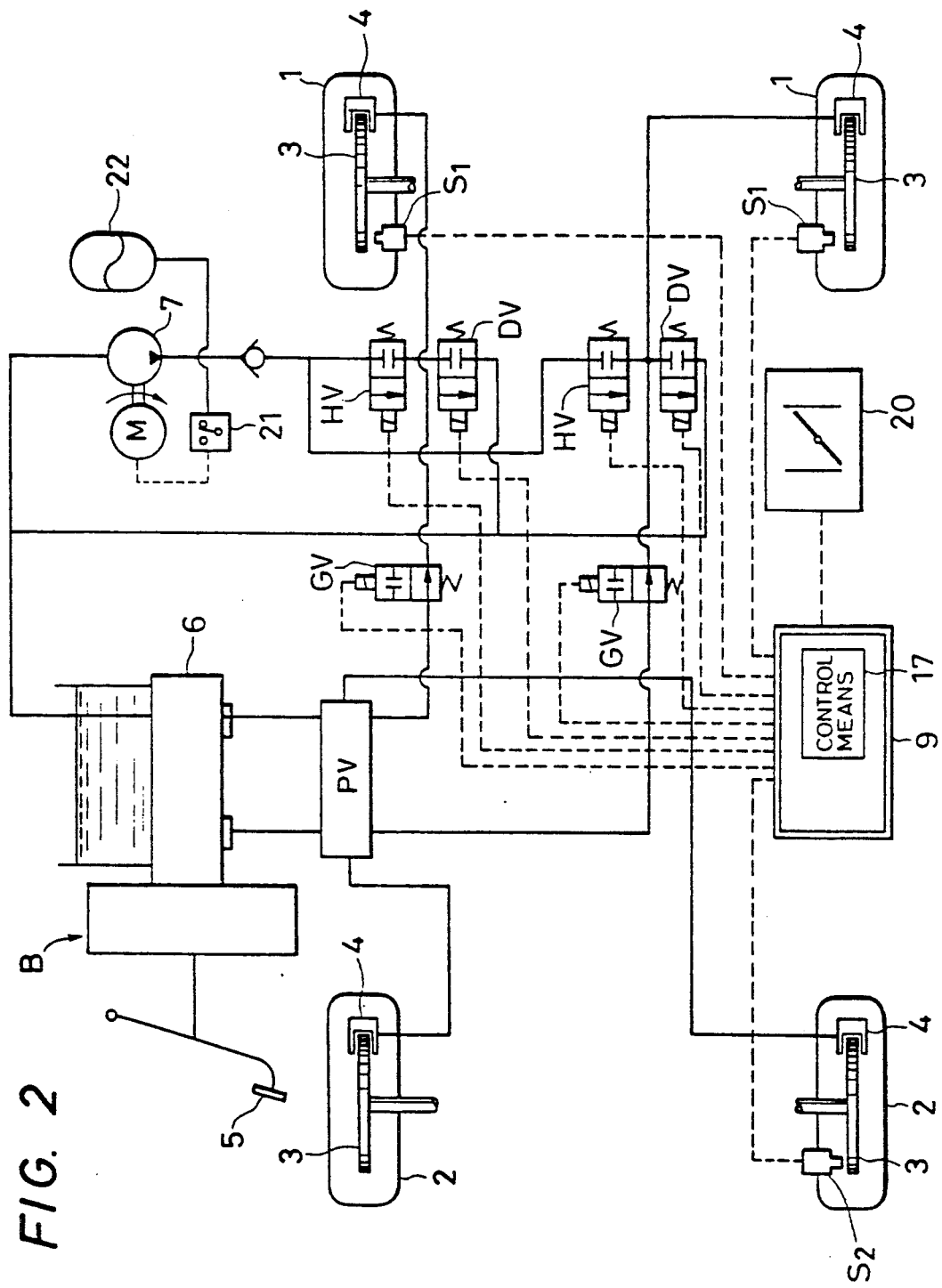
FIG. 2 is a circuit diagram of the control system.

FIG. 2 is a circuit diagram of the driving force control system of the invention applied to an automobile. FIG. 1 is a block diagram of the system. Braking force derived from a brake B acts on driving wheels 1, 1 and driven wheels 2, 2 and the illustrated brake B is such that hydraulic oil in a master cylinder 6 is supplied to brake cylinders each corresponding to the rotors 3 of the wheels 1, 2 through a proportioning valve PV and gate valves GV. These valves are conventionally used when a brake pedal 5 is actuated, or brake pistons press brake shoes against rotors 3 as hydraulic oil in a pump 7 is supplied through the operation of hold valves HV and decay valves DV, described below.

The proportioning valve PV in that case functions so that the percentage of hydraulic oil supplied to each of the brake cylinders 4 of wheels, 1, 2 may be changed. Opening or closing of the gate valve GV supplies hydraulic oil in the master cylinder 6 to the brake cylinder 4 or stops supplying the oil. Similarly, opening or closing of the hold valve HV controls the supply of hydraulic oil in the pump 7. Operation of the decay valve DV controls the discharge of hydraulic oil in the brake cylinder 4.

An example of the control means of the invention will subsequently be described. A rotary sensor $S_1$ for detecting the number of revolutions of each driving wheel and a speed calculating means 10 comprise a speed detecting means 11 for calculating the speed of revolution $V_D$ of the driving wheel 1.

Figure 3:
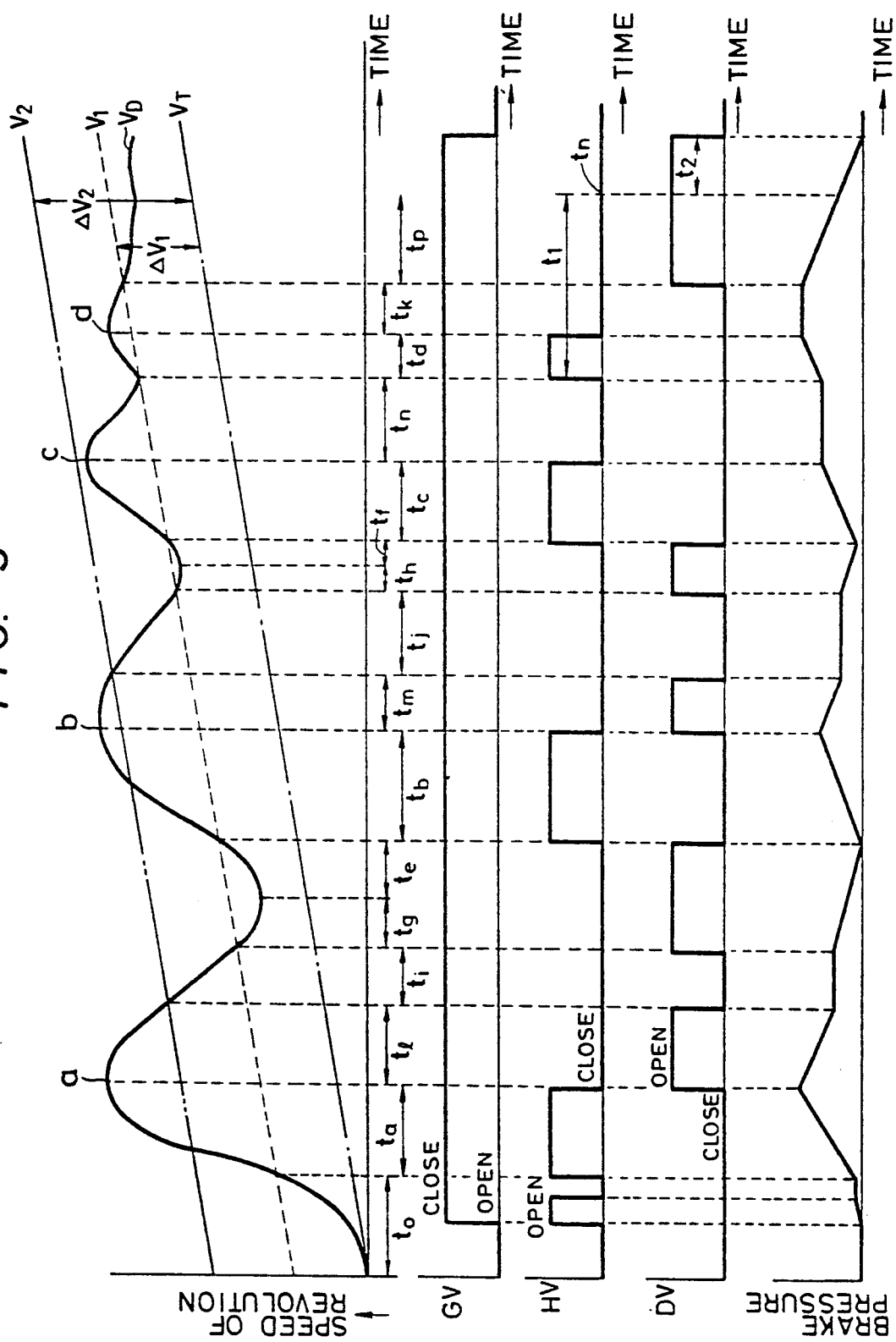
FIG. 3 is a control characteristic diagram.

A first threshold value $V_1$ representing a preferred speed of revolution for controlling the speed of revolution of each driving wheel 1, and a second threshold value $V_2$ representing a speed higher than the former are set. To do this, the speed of revolution $V_T$ of each driven wheel 2 is detected by a speed calculating means 14 provided in a microcomputer 9. The speed $V_T$ is based on the number of revolutions of the driven wheel detected by a rotary sensor $S_2$. As shown in FIG. 3, the first threshold value $V_1$ and the second threshold value $V_2$ are calculated and set by adding a speed $\Delta V_1$ and another speed $\Delta V_2$ to the speed of revolution $V_T$ by a first threshold setting means 15 and a second threshold setting means 16, which are provided in the microcomputer 9. The rotary sensor $S_2$, the speed calculating means 14 and the first and second threshold value setting means 15, 16 comprise threshold value setting means 13.

A control means 17 provided in the microcomputer 9 examines the relation of the speed of revolution $V_D$ of the driving wheel 1 to the first and second threshold values $V_1$, $V_2$, and determines whether the speed is increasing. Control means 17 issues instructions as to the switching of the gate valve GV, the hold valve HV and the decay valve DV.

Figure 4:
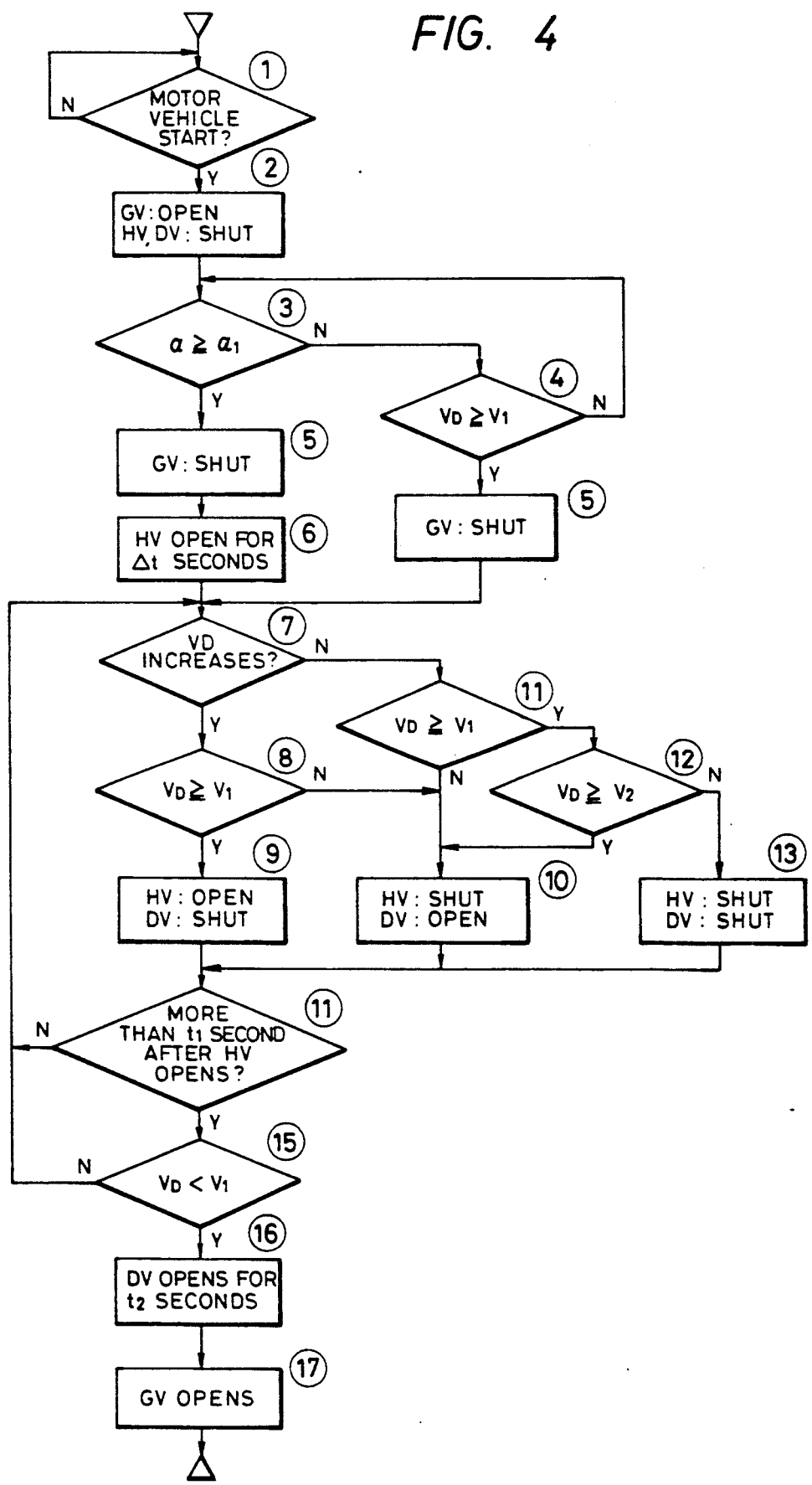
FIG. 4 is a control flowchart.

Thus, changes in the speed of revolution $V_D$ of the driving wheel 1, the switching of the gate valve GV, the hold valve HV and the decay valve DV, and increases and decreases in the brake pressure within the brake cylinder 4 are shown in the upper, middle and lower portions of FIG. 3, respectively. FIG. 4 shows instructions given by the control means 17.

When a motor vehicle starts moving, control is commenced (Step 1) and, while the gate valves GV are kept open, the hold valves HV and the decay valves DV are shut (Step 2), so that the brake may be actuated by the brake pedal 5. Subsequently, during time $t_0$ only until the speed of revolution $V_D$ reaches the first threshold value $V_1$, the initial acceleration $\alpha$ of the driving wheel 1 is calculated by an initial acceleration calculating means 18. When the initial acceleration exceeds a value $\alpha_1$ of initial acceleration set by an initial acceleration setting means 19 (Step 3) or the speed of revolution $V_D$ exceeds the first threshold value $V_1$ (Step 4), the gate valves GV is shut (Step 5) to nullify the operation of the brake pedal 5.

It is satisfactory to allow the control to be commenced at a time when the speed of revolution $V_D$ exceeds the first threshold value $V_1$. However, when the accelerator pedal is abruptly stepped on while the vehicle is running on a road surface offering an extralow friction coefficient, acceleration should be examined even within the range of $V_D \leq V_1$ for causing the control to be commenced earlier. When $\alpha \geq \alpha_1$, the above situation applies. The hold valves HV are then opened for a fixed period of time, $\Delta t$ seconds, (Step 6) so as to presupply a small amount of hydraulic oil to the brake cylinders 4.

Then the brake cylinders are slightly moved to nullify any gap between the brake shoe and the rotor 3 and allow the braking force to be applied quickly when the vehicle is abruptly accelerated on the slippery road surface. The difference between the speed of revolution $V_D$ at the preceding point of time and that at the present point of time is detected and used to determine whether the speed of revolution $V_D$ is increasing after the period of commencement of the control has passed (Step 7). The hold valves HV are opened when the speed of revolution $V_D$ exceeds the first threshold value $V_1$ (ta, tb ... td of FIG. 3), provided that the speed of revolution is increasing, and the decay valves DV are shut (Steps 8, 9). This supplies the hydraulic oil in the pump 7 to the brake cylinders 4 so as to increase the brake pressure. When the speed of revolution $V_D$ is lower than the first threshold value $V_1$ while the speed is increasing (te, tf of FIG. 3), the hold valves HV are shut and the decay valves DV are opened (Step 10). Thus, the hydraulic oil within the brake cylinders 4 is discharged to reduce the brake pressure. When the speed of revolution $V_D$ does not exceed the first threshold value $V_1$ while the speed is not increasing (tg, th of FIG. 3), the brake pressure is reduced as in the cases of Steps 11, 10. When the speed of revolution $V_D$ exceeds the first threshold value $V_1$, but does not exceed the second threshold value $V_2$ (ti, tj, tk), both the hold valves HV and the decay valves DV are shut (Steps 12, 13). Thus, the hydraulic oil within the brake cylinders 4 is maintained. When the speed of revolution $V_D$ exceeds the second threshold value $V_2$ while the speed is decreasing (tl, tm, tn), the hold valves HV are shut and the decay valves DV are opened (Steps 12, 10). Thus, the brake pressure is reduced. The above control operation is repeated and the speed of revolution $V_D$ of the driving wheels 1 gradually reaches a fixed value close to the first threshold value $V_1$ (tp of FIG. 3). When the speed of revolution $V_D$ does not exceed the first threshold value $V_1$ within $t_1$ seconds after the hold valves HV are opened (tx of FIG. 3), the high pressure oil in the brake cylinders is discharged by opening of the decay valves DV for a short period of time $t_2$ from the point of time tx. In this case, however, pins inside the master cylinder 6 should be prevented from being damaged by the high pressure oil in the brake cylinders 4 while the oil flows back to the master cylinder to completely release the brake. Then the gate valves GV are opened (Steps 14, 15, 16, 17) to terminate the control and each driving wheel 1 is maintained in the state where its speed of revolution $V_D$ does not exceed the first threshold value $V_1$, but with minimized slipping.

In case the brake pedal 5 is stepped on during the control operation, the decay valves DV are opened for only $t_2$ seconds to discharge the high pressure oil within the brake cylinders totally. Since the oil does not flow back to the master cylinder, the gate valves GV may be opened so that the control of the brake by the brake pedal 5 can be restored.

The above-described embodiment is applicable to a single driving wheel 1 or a plurality of them. A rotary sensor of a generator type may be used as the speed detecting means 11, and the brake B may be actuated by either air or hydraulic oil. The first and second threshold values $V_1$, $V_2$ may be set by adding not only fixed speeds $V_1$, $V_2$, but also variable speeds representing the speed of revolution of the driven wheels. Furthermore, it may also be acceptable to set some values without regard to the speed of the driven wheels 2.

In FIG. 2, a throttle, a pressure switch and an accumulator are designated by numerals 20, 21, and 22, respectively.

In the system for controlling motor vehicle driving force thus constructed according to the present invention, first threshold value $V_1$ as the desirable speed of revolution of the driving wheel 1, and second threshold value $V_2$ which is slightly higher than $V_1$, are determined. By examining the relation of the speed of the driving wheel 1 to those threshold values, and by verifying whether the speed thereof is increasing, deviations from the first threshold $V_1$ value maybe detected. Thus, the speed of the vehicle can be maintained at a desired level, and system reliability also may be greatly improved. Since the determination is made based only on the speed, poor response characteristics due to extremely prolonged calculation time inherent in determining acceleration can be avoided. Excessive slipping when the vehicle is initially moved and during its subsequent travel can also be prevented, so that greater driving force results.

In reference to FIG. 3, it is possible to increase, decrease or maintain the brake pressure as set forth above by determining whether the speed of revolution VD of the driving wheel 1 is increasing or decreasing when the speed thereof is changing with relation to the high peak values a, b, c . . .

Various modifications and variations could be made in the invention without departing from the scope or spirit of the invention.

What is claimed is:

1. A system for controlling a driving force of a motor vehicle including a driving wheel and a driven wheel, the driving wheel disposed to be accelerated by a motor vehicle engine and subjected to variable pressure from a braking means, for use to minimize slipping of the driving wheel during acceleration of the vehicle comprising:

means for detecting the speed of revolution of the driven wheel;

means for detecting the speed of revolution of the driving wheel;

means for determining a first threshold speed value by adding a first predetermined speed to the speed of revolution of the driven wheel;

means for determining a second threshold speed value by adding a second predetermined speed larger than said first predetermined speed to the speed of revolution of the driven wheel; and means for controlling brake pressure, during acceleration of the driving wheel by the motor vehicle engine, on the driving wheel of the vehicle in accordance with an acceleration of the vehicle by comparing te speed of revolution of the driving wheel to said first threshold speed value and to said second threshold speed value.

2. The system of claim 1, further including means for calculating an acceleration of the driving wheel and means for comparing said driving wheel acceleration to a predetermined value, wherein said brake pressure controlling means is operable for selectively increasing, decreasing and maintaining said brake pressure in response to at least one of the conditions of an increase in said driving wheel acceleration greater than or equal to said predetermined value and an increase in speed of the driving wheel of greater than or equal to said first threshold speed value.

3. The system of claim 2, including means for detecting whether the driving wheel speed is increasing.

4. The system of claim 3, wherein the brake pressure controlling means decreases the brake pressure on the driving wheel in response to at least one of the conditions of said driving wheel having a speed which is not increasing at times when the driving wheel speed is greater than said second threshold speed value and the driving wheel speed being less than said first threshold speed value.

5. The system of claim 3, wherein said brake pressure controlling means maintains the brake pressure on the driving wheel in response to the condition of said driving wheel having a speed which is not increasing at times when said driving wheel speed is greater than or equal to said first threshold speed value and less than said second threshold speed value.

6. The system of claim 2, wherein said brake pressure control means increases the brake pressure of the driving wheel in response to the condition of increasing driving wheel speed and at times when said driving wheel speed is greater than or equal to said first threshold speed value.

7. In a vehicle for traveling over a surface, the vehicle having a driving wheel and a driven wheel, the driving wheel disposed to be accelerated by a motor vehicle engine and subjected to variable pressure from a braking means, a method for accelerating the vehicle while controlling slippage of the driving wheel comprising the steps of:

detecting a rotation speed of the driven wheel, while accelerating the driving wheel with the motor vehicle engine;

detecting a rotation speed of the driving wheel, while accelerating the driving wheel with the moor vehicle engine;

determining whether the rotation speed of the driving wheel exceeds a first sum corresponding to the rotation speed of the driven wheel and a first positive value, while accelerating the driving wheel with the motor vehicle engine;

determining whether the rotation speed of the driving wheel exceeds a second sum corresponding to the rotation speed of the driven wheel and a second positive value, while accelerating the driving wheel with the motor vehicle engine, the second positive value being larger than the first positive value;

determining whether the rotation speed of the driving wheel is increasing, while accelerating the driving wheel with the motor vehicle engine;

increasing the amount of pressure at times when the rotation speed is increasing and exceeds the first sum, while accelerating the driving wheel with the motor vehicle engine;

decreasing the amount of pressure at times when the rotation speed of the driving wheel is both not increasing and exceeds the second sum; and decreasing the amount of pressure at times when the rotation speed of the driving wheel is both not increasing and does not exceed the first sum.

8. A method according to claim 7, wherein the step of determining whether the rotation speed is increasing includes the substep of comparing, responsive to the step of detecting a rotation speed of the driving wheel, the rotation speed of the driving wheel at 2 successive points in time.

9. A method according to claim 7, further including the step of setting the first positive value to a constant.

10. A method according to claim 9, further including the step of setting the second positive value to a constant.

11. A method according to claim 7, further including the step of setting the first positive value in accordance with the speed of the driven wheel.

12. A method according to claim 11, further including the step of
setting the second positive value in accordance with the speed of the driven wheel.

13. In a vehicle for traveling over a surface, the vehicle having a driving wheel and a driven wheel, the driving wheel disposed to be accelerated by a motor vehicle engine and subjected to variable pressure from a braking means, a system for accelerating the vehicle while controlling slippage of the driving wheel comprising:

first detecting means for detecting a rotation speed of the driven wheel;

second detecting means for detecting a rotation speed of the driving wheel;

first determining means, coupled to the first detecting means and to the second detecting means, for determining whether the rotation speed of the driving wheel exceeds a first sum corresponding to the rotation speed of the driven wheel and a first positive value;

second determining means, coupled to the first detecting means and to the second detecting means, for determining whether the rotation speed of the driving wheel exceeds a second sum corresponding to the rotation speed of the driven wheel and a second positive value, the second positive value being larger than the first positive value;

third determining means, coupled to the first detecting means, for determining whether to rotation speed of the driving wheel is increasing;

means, coupled to the first determining means and to the third determining means, for increasing the amount of pressure, during acceleration of the driving wheel by the motor vehicle engine, at times when the rotation speed of the driving wheel is increasing and exceeds the first sum;

means, coupled to the second determining means and to the third determining means, for decreasing the amount of pressure at time when the rotation speed of the driving wheel is both not increasing and exceeds the second sum;

means, coupled to the first determining means and to the third determining means, for decreasing the amount of pressure at times when the rotation speed of the driving wheel is both not increasing and does not exceed the first sum.

14. A system according to claim 13, further including fluid pressure supplying means, wherein the means for increasing the pressure includes a first valve means connected in series between the fluid pressure supplying means and the driving wheel.

15. A system according to claim 13, further including fluid reservoir means, wherein the means for decreasing the pressure includes a second valve means connected in series between the fluid reservoir means and the driving wheel.

16. A system according to claim 15, further including a brake actuator, coupled to the driving wheel in parallel with the pressure increasing means, and means for coupling the brake actuator to a brake pedal.

17. A system according to claim 16, further including means for detecting an acceleration of the driving wheel greater than a predetermined acceleration;
third valve means, connected in series between the brake actuator and the driving wheel; and
means, coupled to the acceleration detecting means, for closing the third valve means in response to the detected acceleration being greater than said predetermined acceleration.

18. A system according to claim 13, further including means for detecting an acceleration of the driving wheel greater than a predetermined acceleration;
means, coupled to the first determining means and to the acceleration detecting means, for opening a first valve for a predetermined period of time in response to the speed of the driving wheel being less than the first sum and the acceleration of the driving wheel being greater than the predetermined acceleration.

19. A system according to claim 13, wherein the means for determining whether the rotational speed of the driving wheel is increasing includes
means, coupled to the means for detecting a rotation speed of the driving wheel, for comparing the rotation speed of the driving wheel at 2 successive points in time.

20. A system according to claim 13, further including means for setting the first positive value to a constant.

21. A system according to claim 20, further including means for setting the second positive value to a constant.

22. A system according to claim 13, further including means for setting the first positive value in accordance with the speed of the driven wheel.

23. A system according to claim 20, further including means for setting the second positive value in accordance with the speed of the driven wheel.

* * * * *

UNITED STATES PATENT AND TRADEMARK OFFICE
CERTIFICATE OF CORRECTION

PATENT NO. : 5,126,997
DATED : June 30, 1992
INVENTOR(S) : Hiroide Fukuda et al.

It is certified that error appears in the above-identified patent and that said Letters Patent is hereby corrected as shown below:

Claim 1, column 5, line 47, change "te" to --the--.

Claim 7, column 6, line 27, change "moor" to --motor--.

Claim 13, column 7, line 33, after "whether" change "to" to --the--.

Signed and Sealed this

Twenty-eighth Day of September, 1993

Attest:

BRUCE LEHMAN

Attesting Officer    Commissioner of Patents and Trademarks